(12) United States Patent
Nagasawa (10) Patent No.: US 11,351,956 B2
(45) Date of Patent: Jun. 7, 2022

(54) AIRBAG DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 93 days.

(21) Appl. No.: 16/751,232

(22) Filed: Jan. 24, 2020

(65) Prior Publication Data

US 2020/0307503 A1 Oct. 1, 2020

(30) Foreign Application Priority Data

Mar. 29, 2019 (JP) .............................. JP2019-066275

(51) Int. Cl.
*B60R 21/34* (2011.01)
*B60R 21/36* (2011.01)

(52) U.S. Cl.
CPC ........ *B60R 21/36* (2013.01); *B60R 2021/346* (2013.01)

(58) Field of Classification Search
CPC .................... B60R 21/34; B60R 21/36; B60R 2021/23332
See application file for complete search history.

(56) References Cited

U.S. PATENT DOCUMENTS

| | | | |
|---|---|---|---|
| 8,408,350 B2 | 4/2013 | Wilmot et al. | |
| 2004/0169362 A1* | 9/2004 | Hammer | B60R 19/48 280/751 |
| 2005/0269805 A1* | 12/2005 | Kalliske | B60R 21/36 280/730.1 |
| 2006/0043712 A1* | 3/2006 | Hakki | B60R 19/205 280/735 |
| 2007/0114090 A1* | 5/2007 | Okamoto | B60R 21/36 180/274 |
| 2010/0230944 A1* | 9/2010 | Narita | B60R 21/36 280/741 |
| 2012/0267183 A1 | 10/2012 | Wilmot et al. | |
| 2014/0291055 A1* | 10/2014 | Tanaka | B60R 21/36 180/274 |
| 2016/0059822 A1* | 3/2016 | Park | B60R 21/2338 180/274 |

(Continued)

FOREIGN PATENT DOCUMENTS

| | | |
|---|---|---|
| JP | 2010-235007 | 10/2010 |
| JP | 2012-229014 | 11/2012 |

*Primary Examiner* — Barry Gooden, Jr.
(74) *Attorney, Agent, or Firm* — Smith, Gambrell & Russell, LLP (57) ABSTRACT

An airbag device is to be mounted on a vehicle and includes an outer airbag, an inner airbag and a friction generating member. The outer airbag is made of a base cloth and configured to expand and deploy outward of the vehicle. The inner airbag is made of a base cloth and configured to expand and deploy in the outer airbag. The friction generating member is provided on at least one of an inner surface of the outer airbag and an outer surface of the inner airbag. When the inner surface of the deployed outer airbag contacts the outer surface of the deployed inner airbag, the friction generating member generates a frictional force that is greater than a frictional force that is generated when the base cloths of the outer airbag and the inner airbag overlap one another.

16 Claims, 7 Drawing Sheets

(56) References Cited

U.S. PATENT DOCUMENTS

2016/0339866 A1* 11/2016 Pieruch .................. B60R 21/36
2016/0355152 A1* 12/2016 Perez Garcia .... B60R 21/23138
2018/0099639 A1* 4/2018 Suemune ............... B60R 21/36
2019/0106071 A1* 4/2019 Havlik ................. B60R 19/205
2020/0307503 A1* 10/2020 Nagasawa ............... B60R 21/36
2020/0307504 A1* 10/2020 Nagasawa ............... B60R 21/36

* cited by examiner

AIRBAG DEVICE

CROSS-REFERENCE TO RELATED APPLICATIONS

The present application claims priority from Japanese Patent Application No. 2019-066275 filed on Mar. 29, 2019, the entire contents of which are hereby incorporated by reference.

BACKGROUND

The disclosure relates to an airbag device configured to deploy in front of a vehicle, and more specifically to an airbag device configured to protect a walker and a person riding on a two-wheeler (hereinafter referred to as "pedestrian").

Conventionally, in order to protect a pedestrian in a collision with a vehicle, there have been known an airbag device including airbags configured to be deployed and expanded in front of front pillars of the vehicle disclosed, for example, in Japanese Unexamined Patent Application Publication No. 2010-235007, and an airbag device including an airbag configured to be deployed and expanded in front of a bumper of the vehicle disclosed, for example, in Japanese Unexamined Patent Application Publication No. 2012-229014.

SUMMARY

An aspect of the disclosure provides an airbag device to be mounted on a vehicle. The device includes an outer airbag, an inner airbag, and a friction generating member. The outer airbag is made of a base cloth and configured to expand and deploy outward of the vehicle. The inner airbag is made of a base cloth and configured to expand and deploy in the outer airbag. The friction generating member disposed on one or both of an inner surface of the outer airbag and an outer surface of the inner airbag. When the inner surface of the deployed outer airbag contacts the outer surface of the deployed inner airbag, the friction generating member generates a frictional force that is greater than a frictional force that is generated when the base cloths of the outer airbag and the inner airbag overlap one another.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the technology are described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. For the airbag device to protect a pedestrian, there has been a demand to effectively absorb the impact of a collision with a vehicle because, in general, the impact on the pedestrian is greater than that on a passenger in the vehicle.

In particular, when a person riding on a two-wheeler including a bicycle collides with a vehicle, the velocity of the vehicle relative to the bicycle is fast, and there is not enough time for them to sense a danger, and therefore it may not be possible to take on the behavior to securely avoid the collision. Consequently, the impact on the person riding on the two-wheeler in a collision with the vehicle is increased, and therefore it is supposed to reduce the injury of the pedestrian. To address this, it is conceivable to provide a large airbag device configured to deploy in front of the vehicle. Here, the size of the airbag body is increased, the capability to absorb the impact is increased, but the airbag body in contact with the pedestrian is rotated as a caterpillar around the gas contained in the airbag body. This may cause the pedestrian to slide out of the airbag body of the vehicle. In this case, the airbag cannot absorb the displacement of the passenger relative to the vehicle, so that the pedestrian is thrown down from the vehicle. Consequently, the pedestrian may collide with the road surface as a second collision.

It is desirable to provide an airbag device capable of preventing a pedestrian in a collision with a vehicle from sliding on an airbag while effectively absorbing the impact of the collision.

The airbag device is configured to deploy in front of a vehicle to reduce the injury of a protection target person that is a pedestrian in a collision with the vehicle.

Figure 1:
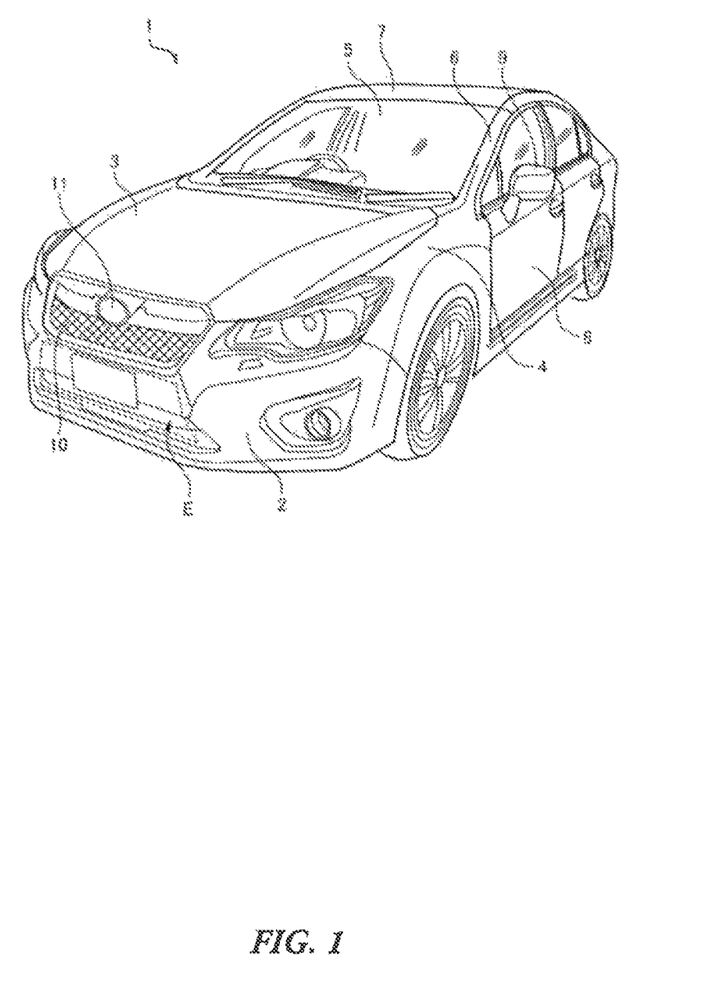
FIG. 1 is a perspective view illustrating a vehicle equipped with an airbag device according to embodiments of the disclosure.
Figure 2:
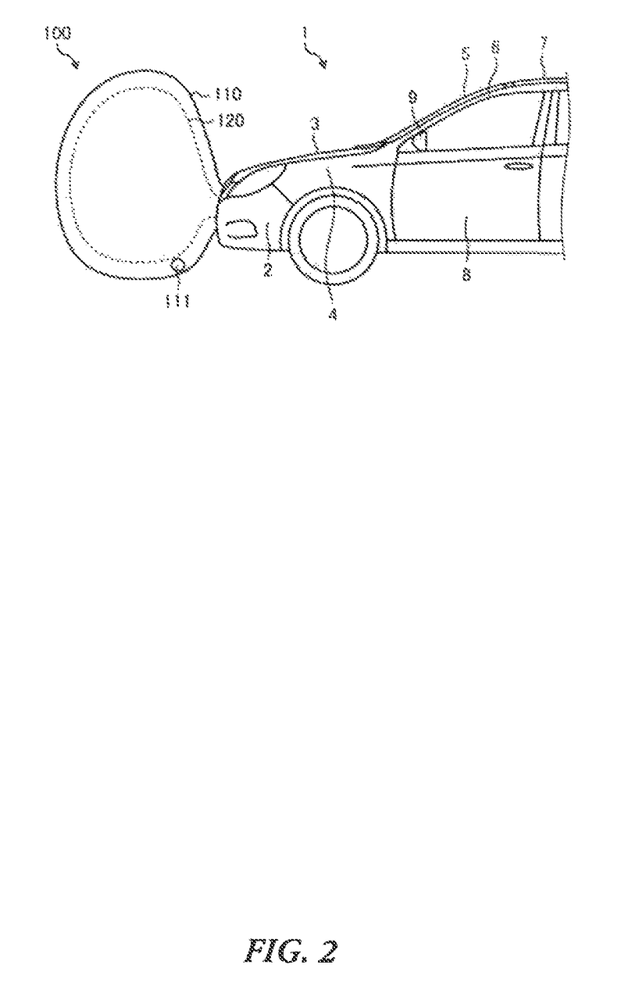
FIG. 2 is a side view illustrating the vehicle when an airbag of the airbag device is deployed.

FIG. 1 is a perspective view illustrating a vehicle 1 equipped with an airbag device E. FIG. 2 is a side view illustrating the vehicle 1 when an airbag of the airbag device E is deployed.

As illustrated in FIGS. 1 and 2, the vehicle 1 equipped with the airbag device E has an external structure including a front bumper 2 on the front end of the vehicle 1, a bonnet 3 above and behind the front bumper 2, a front fender 4 on the side of the bonnet 3, a wind shield 5 behind the bonnet 3, a front pillar 6 on the side edge of the windshield 5, a roof 7 as the ceiling of the vehicle 1, a side door 8 in the side surface of the vehicle 1, and a side mirror 9 on the upper part of the side door 8.

In addition, a front grille 10 configured to take air into the bonnet 3 and a decorative emblem 11 are provided above the front bumper 2.

The airbag device E is provided in (behind) the front bumper 2, and an airbag 100 is folded and stored in the front bumper 2. Here, the airbag device E may be provided not in the front bumper 2 but in (behind) the front grille 10.

The airbag device E includes the airbag 100 formed by a base cloth made of synthetic fabric such as nylon fabric, and an inflator (not shown) configured to supply expansion gas into the airbag 100.

When it is predicted that a protection target person collides with the vehicle 1, the airbag device E actuates the inflator to supply the expansion gas into the airbag 100, and therefore to expand the airbag 100. At this time, the front bumper 2 is removed by the pressure of the expanded airbag 100.

Then, as illustrated in FIG. 2, the airbag 100 of the airbag device E expands and deploys in front of the vehicle 1 from the front bumper 2.

This airbag 100 includes an outer airbag 110 configured to expand and deploy in front of the vehicle 1, and an inner airbag 120 provided in the outer airbag 110 and configured to expand and deploy in front of the vehicle 1.

The outer airbag 110 includes a discharge port 111 configured to be open to communicate with the outside of the outer airbag 110. The expansion gas in the outer airbag 110 is discharged to the outside from the discharge port 111.

Figure 3A:
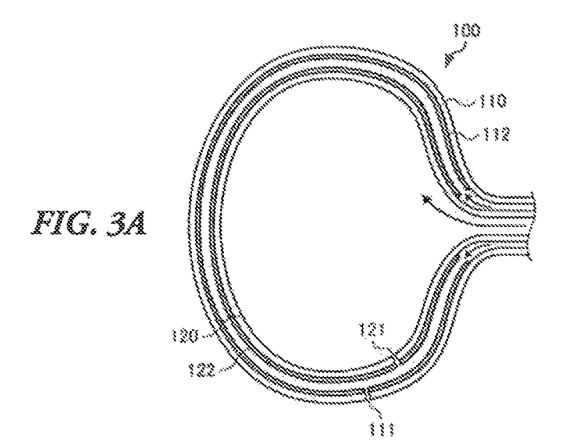
FIGS. 3A-3B are cross-sectional views illustrating the airbag according to Embodiments 1 and 2 taken along the front-to-back direction of the vehicle.
Figure 3B:
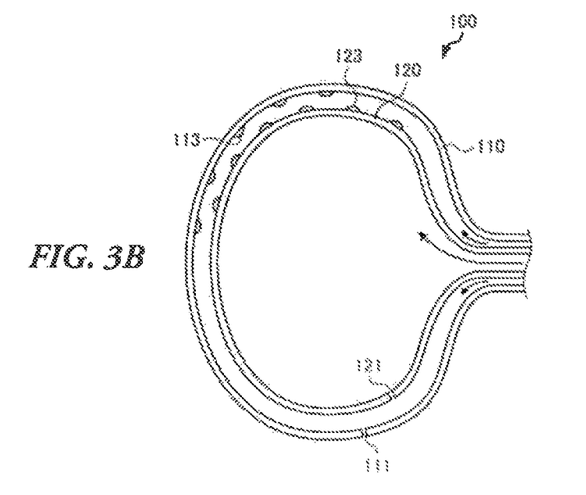

Also the inner airbag 120 includes an inside discharge port 121 configured to be open to communicate with the outer airbag 110 as illustrated in FIGS. 3A-3B.

Next, the internal structure of the airbag 100 will be described.

Figure 4:
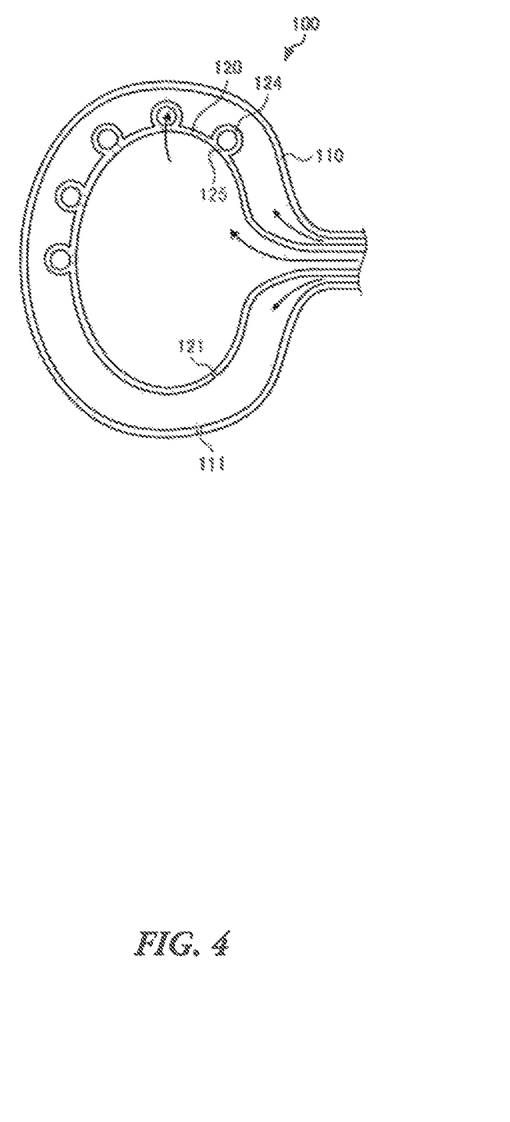
FIG. 4 is a cross-sectional view illustrating the airbag according to Embodiment 3 taken along the front-to-back direction of the vehicle.
Figure 5:
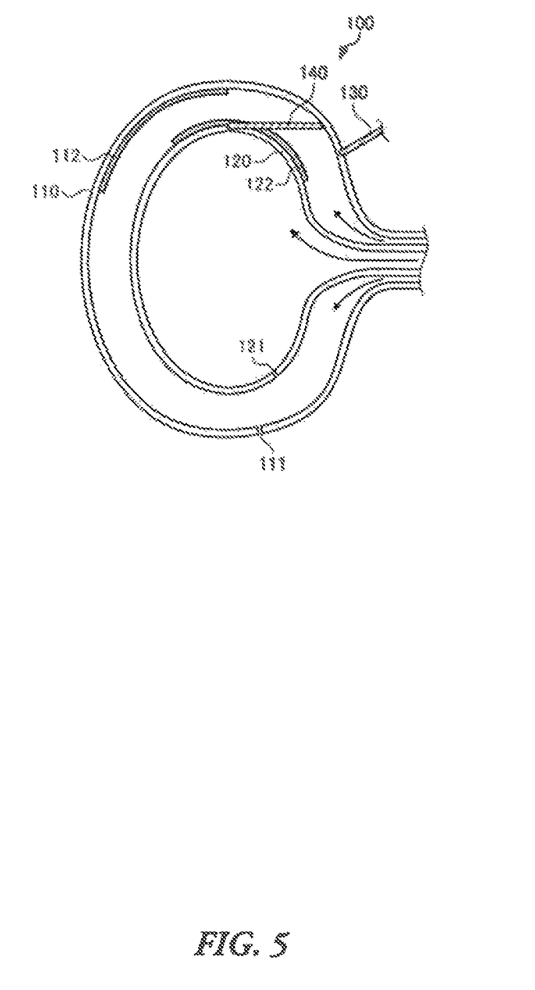
FIG. 5 is a cross-sectional view illustrating the airbag according to Embodiment 4 taken along the front-to-back direction of the vehicle.

FIGS. 3A-3B to FIG. 5 are cross-sectional views illustrating the airbag 100 taken along the front-to-back direction of the vehicle 1.

Embodiment 1

FIG. 3A is a cross-sectional view illustrating the airbag 100 according to Embodiment 1.

As illustrated in FIG. 3A, a first raised fabric 112 which is raised in a first shape, for example, a loop shape is attached to the inner surface of the outer airbag 110, and a second raised fabric 122 which is raised in a second shape, for example, a hook shape is attached to the outer surface of the inner airbag 120.

The first raised fabric 112 and the second raised fabric 122 can engage with one another, which are formed into a so-called hook and loop fastener. Here, the first shape and the second shape may be the same as one another as long as the first raised fabric 112 and the second raised fabric 122 can engage with one another.

The expansion gas from the inflator is supplied into the outer airbag 110 and the inner airbag 120 via individual supply ports, respectively, and the discharge port 111 is provided in the lower and back part of the outer airbag 110. The inner airbag 120 includes the inner discharge port 121 configured to be open to communicate with the outer airbag 110, and the expansion gas in the inner airbag 120 is discharged from the inner discharge port 121 to the outer airbag 110.

By this means, the expansion gas in the outer airbag 110 more easily escapes to the outside than the expansion gas in the inner airbag 120, and therefore the inner pressure of the expanded outer airbag 110 is lower than that of the expanded inner airbag 120. Consequently, the expanded outer airbag 110 can be deformed in a collision with the protection target person.

Meanwhile, the expansion gas in the inner airbag 120 flows into the outer airbag 110 via the inner discharge port 121, and then is discharged to the outside from the discharge port 111. Therefore, the expanded inner airbag 120 also can be deformed in the collision with the protection target person.

As described later, when the expanded outer airbag 110 can be deformed in a collision with the protection target person, the first raised fabric 112 attached to the inner surface of the outer airbag 110 rubs against the second raised fabric 122 attached to the outer surface of the inner airbag 120. As a result, a greater frictional force is generated than a frictional force that is generated when the smooth surfaces of the synthetic base cloths of the outer airbag 110 and the inner airbag 120 overlap and rub against one another. Consequently, it is possible to prevent the protection target person from sliding on the outer airbag 110 in a collision with the vehicle 1 while effectively absorbing the impact.

Here, with Embodiment 1, the first raised fabric 112 is attached to approximately the entire area of the inner surface of the outer airbag 110, and the second raised fabric 122 is attached to approximately the entire area of the outer surface of the inner airbag 120, but this is by no means limiting. The first raised fabric 112 and the second raised fabric 122 may be attached to specific parts except the lower and back parts of the outer airbag 110 and the inner airbag 120, respectively in a side view of the vehicle 1, or may be attached to the center parts of the outer airbag 110 and the inner airbag 122, respectively in a front view of the vehicle 1. It is desired that at least the specific part and the center part of the airbag 100 are easily contacted by the protection target person.

Moreover, with Embodiment 1, the inner surface of the outer airbag 110 rubs against the outer surface of the inner airbag 120 as long as at least the expanded outer airbag 110 can be deformed in a collision with the protection target person, and therefore the inner airbag 120 may not necessarily include the inner discharge port 121. The same applies to Embodiments 2 to 4 described later.

Embodiment 2

FIG. 3B is a cross-sectional view illustrating the airbag 100 according to Embodiment 2 where convex portions are provided in the airbag 100 instead of the hook and loop fastener.

As illustrated in FIG. 3B, first convex portions 113 are attached to the inner surface of the outer airbag 110 to protrude from the inner surface of the outer airbag 110, and second convex portions 123 are attached to the outer surface of the inner airbag 120 to protrude from the outer surface of the inner airbag 120.

The first convex portions 113 and the second convex portions 123 are formed by elastic members such as rubber.

When the inner surface of the outer airbag 110 rubs against the outer surface of the inner airbag 120, the first convex portions 113 and the second convex portions 123 allow a greater frictional force to be generated than a frictional force that is generated in the case where the smooth surfaces of the synthetic base cloths of the outer airbag 110 and the inner airbag 120 overlap and rub against one another. Moreover, the first convex portions 113 and the second convex portions 123 are elastic members, and therefore it is possible to absorb an impact directly applied to the convex portions 123.

In addition, with Embodiment 2, the first convex portions 113 attached to the inner surface of the outer airbag 110 and the second convex portions 123 attached to the outer surface of the inner airbag 120 are opposed and staggered in a side view of the vehicle 1. In particular, the first convex portions 113 attached to the inner surface of the outer airbag 110 are staggered from the second convex portions 123 attached to the outer surface of the inner airbag 120 toward the front face of the airbag 100. By this arrangement, after the protection target person is primarily protected by the airbag 100, when the protection target person with the airbag 100 slumps against the bonnet 3, the first convex portions 113 effectively rub against the second convex portions 123. Consequently, it is possible to effectively generate a frictional force.

Here, with Embodiment 2, the convex portions are attached both the inner surface of the outer airbag 110 and the outer surface of the inner airbag 120, but this is by no means limiting. Either a case of the first convex portions 113 attached to the inner surface of the outer airbag 110 or a case of the second convex portions 123 attached to the outer surface of the inner airbag 120 may be possible.

Moreover, with Embodiment 2, the first convex portions 113 attached to the inner surface of the outer airbag 110 and the second convex portions 123 attached to the outer surface of the inner airbag 120 are opposed and staggered, but this is by no means limiting. The first convex portions 113 attached to the inner surface of the outer airbag 110 and the second convex portions 123 attached to the outer surface of the inner airbag 120 which are opposed to each other may not be staggered. Moreover, the first convex portions 113 and the second convex portions 123 may be attached to specific parts except the lower and back parts of the outer airbag 110 and the inner airbag 120, respectively in a side view of the vehicle 1, or may be attached to approximately the entire area of the inner surface of the outer airbag 110 and the outer surface of the inner airbag 120.

Moreover, with Embodiment 2, the first convex portions 113 and the second convex portions 123 are formed by elastic members, but this is by no means limiting. The first convex portions 113 and the second convex portions 123 may be formed by thermally expandable members that are expanded by mixing a foaming agent such as polypropylene, sodium hydrogen carbonate, ammonium carbonate, diazoaminobenzene, and dinitrosopentamethylenetetramine and applying the heat of the expansion gas, instead of the elastic members. As described above, the first convex portions 113 and the second convex portions 123 are formed by thermally expandable members, and therefore it is possible to increase the convex portions in size to increase the frictional force.

Embodiment 3

FIG. 4 is a cross-sectional view illustrating the airbag 100 according to Embodiment 3 where small pouches are provided in the airbag 100 instead of the hook and loop fastener.

As illustrated in FIG. 4, small pouches 124 which are smaller than the outer airbag 110 are attached to the outer surface of the inner airbag 120.

An intake port 125 configured to take in the expansion gas supplied inside the inner airbag 120 is formed in each of the small pouches 124. The expansion gas is taken in from the intake port 125 to expand the small pouch 124.

When the inner surface of the outer airbag 110 rubs against the outer surface of the inner airbag 120, the small pouches 124 also allow a greater frictional force to be generated than a frictional force that is generated in the case where the smooth surfaces of the synthetic base cloths of the outer airbag 110 and the inner airbag 120 overlap and rub against one another.

With Embodiment 3, the small pouches 124 are attached to a specific part except the lower and back part of the inner airbag 120 in a side view of the vehicle 1, which is easily contacted by the protection target person.

Here, with Embodiment 3, the small pouches 124 are attached to the specific part of the outer surface of the inner airbag 120 in a side view of the vehicle 1, but this is by no means limiting. The small pouches 124 may be attached to approximately the entire area of the outer surface of the inner airbag 120.

Embodiment 4

FIG. 5 is a cross-sectional view illustrating the airbag 100 according to Embodiment 4 where tethers are provided to restrict the deployment direction of the airbag 100.

As illustrated in FIG. 5, a first tether 130 like a cord is provided on the outer part of the airbag 100. One end of the first tether 130 is coupled to the vehicle 1 and the other end of the first tether 130 is coupled to the outer surface of the outer airbag 110. Meanwhile, a second tether 140 like a cord is provided in the airbag 100. One end of the second tether 140 is coupled to the inner surface of the outer airbag 110 and the other end of the second tether 140 is coupled to the outer surface of the inner airbag 120.

The first tether 130 is attached to the outer part of the airbag 100 above the outer airbag 110 and the inner airbag 120 at an angle to form a downslope from the back part to the front part of the airbag 100 in the front-to-back direction of the vehicle 1.

As described above, the tether 130 is provided above the outer airbag 110 and the inner airbag 120 at the angle to form a downslope from the back part to the front part of the airbag 100 in the front-to-back direction of the vehicle 1, and therefore it is possible to prevent the airbag 100 from hanging down. Moreover, the first tether 130 can restrict the airbag 100 from falling down to allow the airbag 100 to fall toward the bonnet 3.

The second tether 140 is provided above the inner airbag 120 and attached to the interior of the airbag 100 at an angle approximately parallel to the deployment direction of the outer airbag 110 (for example, the horizontal line in the front-to-back direction of the vehicle 1).

As described above, the second tether 140 is provided at the angle approximately parallel to the deployment direction of the outer airbag 110 (for example, the horizontal line in the front-to-back direction of the vehicle 1), and therefore it is possible to deploy the inner airbag 120 in the direction approximately the same as the deployment direction of the outer airbag 110.

Here, with Embodiment 4, the tethers are provided outside and inside the airbag 100, but this is by no means limiting. A tether may be provided either outside or inside the airbag 100.

In addition, with Embodiment 4, the first raised fabric 112 attached to the inner surface of the outer airbag 110 and the second raised fabric 122 attached to the outer surface of the inner airbag 120 are opposed and staggered. In particular, the first raised fabric 112 attached to the inner surface of the outer airbag 110 is staggered from the second raised fabric 122 attached to the outer surface of the inner airbag 120 toward the front face of the airbag 100. By this means, it is possible to effectively rub the first raised fabric 112 against the second raised fabric 122 to effectively generate a frictional force in the same way as in Embodiment 2.

Here, with Embodiment 4, the first raised fabric 112 attached to the inner surface of the outer airbag 110 and the second raised fabric 122 attached to the outer surface of the inner airbag 120 which are opposed one another may not be staggered. Moreover, the first raised fabric 112 and the second raised fabric 122 may be attached to specific parts except the lower and back parts of the outer airbag 110 and the inner airbag 120, respectively in a side view of the vehicle 1, or may be attached to approximately the entire area of the inner surface of the outer airbag 110 and the outer surface of the inner airbag 120.

<Form Change of Airbag>

A mechanism capable of effectively absorb the impact of a collision of the protection target person with the vehicle 1 by using the airbag 100 according to Embodiments 1 to 4 will be described with reference to FIGS. 6A-6B.

Figure 6A:
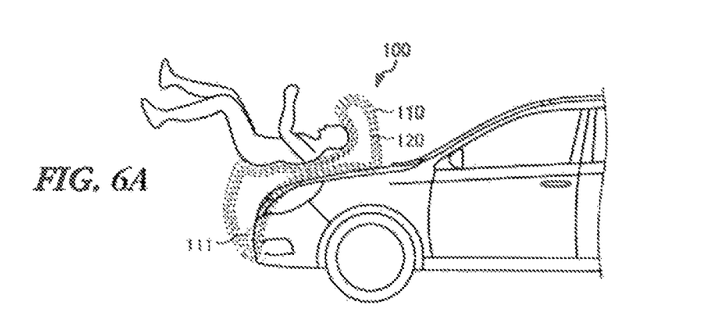
FIGS. 6A-6B are schematic views illustrating the form change of the airbag when a protection target person collides with the airbag.
Figure 6B:
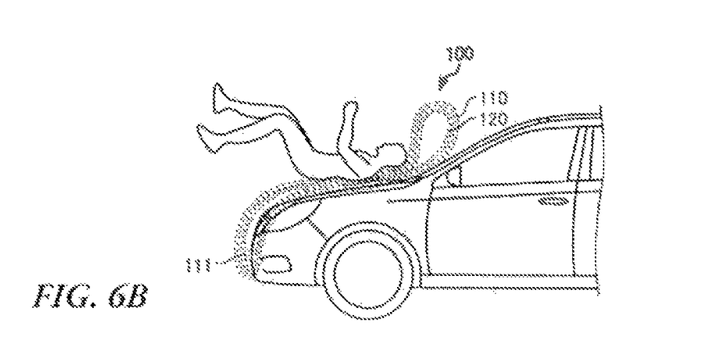

FIGS. 6A-6B are schematic views illustrating the form change of the airbag 100 when the protection target person collides with the airbag 100.

As illustrated in FIG. 6A, in the case of a collision of the protection target person with the vehicle 1, the protection target person first collides with the airbag 100, and then the airbag 100 is deformed by the impact from the protection target person.

At this time, the inner surface of the outer airbag 110 rubs against the outer surface of the inner airbag 120. By this means, the first raised fabric 112 and the second raised fabric 122, the first convex portions 113 and the second convex portions 123, or the small pouches 124 allow a greater frictional force to be generated in the airbag 100 than a frictional force that is generated when the smooth surfaces of the synthetic base cloths of the outer airbag 110 and the inner airbag 120 overlap and rub against one another.

As a result, it is possible to prevent the protection target person from sliding on the outer airbag 110 in a collision with the vehicle 1 while effectively absorbing the impact, and therefore to reduce the injury of the protection target person.

<Modification>

With Embodiments 1 to 4, one airbag 100 is expanded and deployed in front of the vehicle 1, and a great frictional force is generated in the airbag 100, but this is by no means limiting. Another airbag may be provided.

Figure 7:
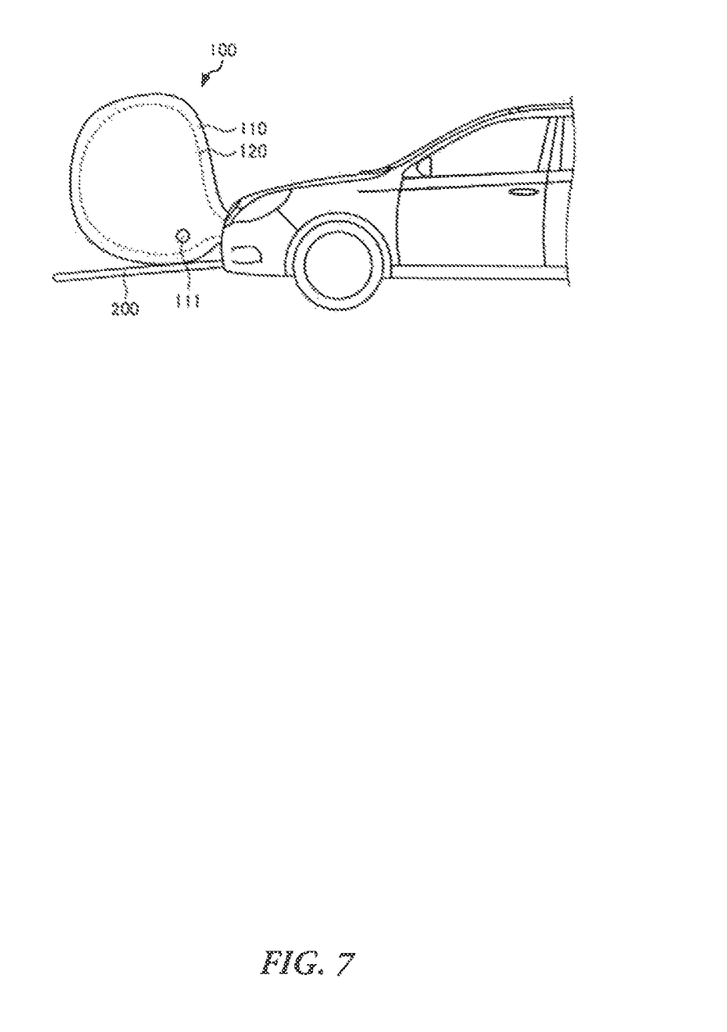
FIG. 7 is a side view illustrating the vehicle with the airbag according to a modification of Embodiments 1 to 4.

For example, as illustrated in FIG. 7, a thin semi-elliptical or rectangular airbag 200 may be provided under the airbag 100 in front of the vehicle 1.

Here, the front end of the airbag 200 is deployed ahead of the front end of the airbag 100 in the front-to-back direction of the vehicle 1. Moreover, the upper end of the airbag 200 is located on the same level or under the knees of the protection target person. By this means, the airbag 200 can function to sweep the feet of the protection target person.

By adding the airbag 200 to the airbag 100, the airbag 200 first sweeps the feet of the protection target person to cause the protection target person to slump against the airbag 100. Then, it is possible to effectively absorb the impact on the protection target person by the frictional force generated in the airbag 100.

Although there are various collision manners of the protection target person, the airbag 200 sweeping the feet of the protection target person allows the protection target person to slump against the airbag 100, and therefore it is possible to predict the collision manner, and therefore to effectively absorb the impact.

As described above, the airbag device E can prevent the protection target person in a collision with the vehicle 1 from sliding on the airbag 100 while effectively absorbing the impact, and therefore can reduce the injury of the protection target person.

The invention claimed is:

1. An airbag device to be mounted on a vehicle, the airbag device comprising:
   an outer airbag made of a base cloth and configured to expand and deploy outward of the vehicle;
   an inner airbag made of a base cloth and configured to expand and deploy in the outer airbag;
   a friction generating member provided on at least one of an inner surface of the outer airbag and an outer surface of the inner airbag,
   wherein when the inner surface of the deployed outer airbag contacts the outer surface of the deployed inner airbag, the friction generating member generates a frictional force that is greater than one generated when the base cloths of the outer airbag and the inner airbag overlap one another; and
   a deployment restriction member provided on at least one of the outer airbag and the inner airbag and configured to restrict a deployment direction of one of the outer airbag and the inner airbag, and wherein the deployment restriction member provided on at least one of the outer airbag and the inner airbag includes a tether.

2. The airbag device according to claim 1, wherein the friction generating member provided on at least one of the inner surface of the outer airbag and the outer surface of the inner airbag includes a convex portion configured to cause the frictional force to be generated.

3. The airbag device according to claim 1, wherein
   one of the inner surface of the outer airbag and the outer surface of the inner airbag includes a first raised fabric in a first shape, and
   the other of the inner surface of the outer airbag and the outer surface of the inner airbag includes a second raised fabric in a second shape capable of engaging with the first raised fabric.

4. The airbag device according to claim 1 wherein said tether and a second tether are provided as deployment restriction members, respectively connected to the outer and the inner airbags.

5. The airbag device according to claim 1 wherein deployment restriction members are provided on each of the inner and outer airbags.

6. The airbag device according to claim 1 wherein the friction generating member is provided on both the inner surface of the outer airbag and the outer surface of the inner airbag.

7. An airbag device to be mounted on a vehicle, the airbag device comprising:
   an outer airbag made of a base cloth and configured to expand and deploy outward of the vehicle;
   an inner airbag made of a base cloth and configured to expand and deploy in the outer airbag; and
   a friction generating member provided on at least one of an inner surface of the outer airbag and an outer surface of the inner airbag,
   wherein when the inner surface of the deployed outer airbag contacts the outer surface of the deployed inner airbag, the friction generating member generates a frictional force that is greater than one generated when the base cloths of the outer airbag and the inner airbag overlap one another, and wherein an inner pressure of the expanded outer airbag is lower than an inner pressure of the expanded inner airbag, and the expanded outer airbag can be deformed when the vehicle collides with a protection target person.

8. The airbag device according to claim 7, further comprising a deployment restriction member provided on at least one of the outer airbag and the inner airbag and configured to restrict a deployment direction of one of the outer airbag and the inner airbag.

9. The airbag device according to claim 7, wherein the friction generating member provided on at least one of the inner surface of the outer airbag and the outer surface of the inner airbag includes a convex portion configured to cause the frictional force to be generated.

10. The airbag device according to claim 9, further comprising a deployment restriction member provided on at least one of the outer airbag and the inner airbag and configured to restrict a deployment direction of one of the outer airbag and the inner airbag.

11. The airbag device according to claim 7, wherein
one of the inner surface of the outer airbag and the outer surface of the inner airbag includes a first raised fabric in a first shape, and
the other of the inner surface of the outer airbag and the outer surface of the inner airbag includes a second raised fabric in a second shape capable of engaging with the first raised fabric.

12. The airbag device according to claim 11, further comprising a deployment restriction member provided on at least one of the outer airbag and the inner airbag and configured to restrict a deployment direction of one of the outer airbag and the inner airbag.

13. The airbag device according to claim 7, wherein the friction generating member provided on at least one of the inner surface of the outer airbag and the outer surface of the inner airbag includes a pouch smaller than the outer airbag and the inner airbag.

14. The airbag device according to claim 13, further comprising a deployment restriction member provided on at least one of the outer airbag and the inner airbag and configured to restrict a deployment direction of one of the outer airbag and the inner airbag.

15. An airbag device to be mounted on a vehicle, the airbag device comprising:
an outer airbag made of a base cloth and configured to expand and deploy outward of the vehicle;
an inner airbag made of a base cloth and configured to expand and deploy in the outer airbag; and
a friction generating member provided on at least one of an inner surface of the outer airbag and an outer surface of the inner airbag,
wherein when the inner surface of the deployed outer airbag contacts the outer surface of the deployed inner airbag, the friction generating member generates a frictional force that is greater than one generated when the base cloths of the outer airbag and the inner airbag overlap one another, and wherein the friction generating member provided on at least one of the inner surface of the outer airbag and the outer surface of the inner airbag includes a pouch smaller than the outer airbag and the inner airbag.

16. The airbag device according to claim 15, further comprising a deployment restriction member provided on at least one of the outer airbag and the inner airbag and configured to restrict a deployment direction of one of the outer airbag and the inner airbag.

* * * * *